United States Patent
Kaneko et al.

(10) Patent No.: US 10,636,572 B2
(45) Date of Patent: *Apr. 28, 2020

(54) MULTILAYER CERAMIC ELECTRONIC DEVICE

(71) Applicant: TDK Corporation, Minato-ku, Tokyo (JP)

(72) Inventors: Toshihiko Kaneko, Tokyo (JP); Shogo Murosawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 15/087,275

(22) Filed: Mar. 31, 2016

(65) Prior Publication Data

US 2016/0293333 A1 Oct. 6, 2016

(30) Foreign Application Priority Data

Mar. 31, 2015 (JP) ................. 2015-073336

(51) Int. Cl.
*H01G 4/30* (2006.01)
*H01G 4/12* (2006.01)
*H01G 4/232* (2006.01)

(52) U.S. Cl.
CPC .............. *H01G 4/30* (2013.01); *H01G 4/12* (2013.01); *H01G 4/232* (2013.01)

(58) Field of Classification Search
CPC .................................... H01G 4/30; H01G 4/005; H01G 4/12; H01G 4/1227; H01G 4/012; H01G 4/1209; H01G 4/232; H01G 4/1218

See application file for complete search history.

(56) References Cited

U.S. PATENT DOCUMENTS

| 9,030,801 B2* | 5/2015 | Kim | H01G 4/012 361/321.2 |
| 2011/0141655 A1* | 6/2011 | Jeong | H01G 4/005 361/303 |
| 2013/0294011 A1 | 11/2013 | Yao | |
| 2013/0342957 A1* | 12/2013 | Konishi | H01G 4/1218 361/301.4 |
| 2014/0126104 A1* | 5/2014 | Kim | H01G 4/1209 361/301.4 |
| 2014/0153156 A1* | 6/2014 | Park | H01G 4/30 361/303 |
| 2015/0027764 A1* | 1/2015 | Lee | H01G 4/30 174/260 |
| 2016/0284473 A1* | 9/2016 | Murosawa | H01G 4/30 |

FOREIGN PATENT DOCUMENTS

| JP | 2003-007562 A | 1/2003 |
| JP | 2007-197233 A | 8/2007 |
| WO | WO 2012/096268 A1 | 7/2012 |

* cited by examiner

*Primary Examiner* — Nguyen T Ha
(74) *Attorney, Agent, or Firm* — Arent Fox LLP (57) ABSTRACT

Provided is a multilayer ceramic electronic device which is capable of preventing decrease of the specific permittivity and of showing less drop of capacitance, even when the dielectric grains constituting the dielectric layers become smaller for thinning of the dielectric layers, wherein Dg/Di≥1 is satisfied, in case that "Di" is an average grain size of the first dielectric grains constituting the dielectric layer in the capacitance region and "Dg" is an average grain size of the second dielectric grains in an exterior area.

14 Claims, 5 Drawing Sheets

MULTILAYER CERAMIC ELECTRONIC DEVICE

BACKGROUND OF THE INVENTION

1. Field of the Invention

The present invention relates to a multilayer ceramic electronic device in which dielectric layers are extremely thin.

2. Description of the Related Art

Together with miniaturization and thinning of electronic equipment, miniaturization and thinning of the multilayer ceramic electronic device stored therein are requested. Thus, thinning of the dielectric layers in the multilayer ceramic electronic device is requested. For instance, the thickness of the dielectric layers is requested to be 5 μm or less.

However, the failures, such as insulation deterioration of the dielectric layers is likely to generate during a high temperature load test and a temperature characteristic of capacitance is deteriorated, are generated as the dielectric layers become thinner. In order to solve such problems, for instance, it is presented to set a metallic thin film layer between the dielectric layers and the internal electrode layers in Patent Article 1. Further, it is presented to unevenly distribute Vanadium (V) component in the crystal grain boundary in Patent Article 2.

However, further miniaturization of the electronic devices is always required. In order to thin the thickness of the dielectric layers to 0.5 μm or less, the dielectric grains constituting the dielectric layers become smaller. However, the specific permittivity of the dielectrics generally tends to depend on the grain size of the dielectric grains, and that the specific permittivity may decrease with extremely small grain size. Thus, the specific permittivity remarkably decreases when the dielectric layers in the multilayer ceramic electronic device are thinned to 0.5 μm or less.

[Patent Article 1] Japanese Unexamined Patent Publication No. 2003-7562

[Patent Article 2] Japanese Unexamined Patent Publication No. 2007-197233

SUMMARY OF THE INVENTION

The present invention has been made by considering the above circumstances, and a purpose of the invention is to provide the multilayer ceramic electronic device which is capable of preventing decrease of the specific permittivity and of showing less drop of the capacitance, even when the dielectric grains constituting the dielectric layers become smaller to make the thickness of the dielectric layers thin.

As a result of intensive studies of the above purpose, the present inventors has attained providing the multilayer ceramic electronic device which is capable of preventing decrease of the specific permittivity and of showing less drop of the capacitance, even when the thickness of the dielectric layers is 0.5 μm or less, and further 0.4 μm or less, by making the average grain size of the dielectric grains constituting so-called "the capacitance region" the same or smaller than the average grain size of the dielectric grains constituting the other areas (what is called "the exterior area" "the lead-out areas" of the electrodes) surrounding the capacitance region, which lead to a completion of the invention.

Namely, the first multilayer ceramic electronic device of the invention includes a ceramic element body, in which a plurality of dielectric layers and a plurality of internal electrode layers are alternately stacked, and at least a pair of external electrodes which are connected to the internal electrode layers on the surface of the ceramic element body, wherein the thickness of the dielectric layers is 0.5 μm or less; and in case that an average grain size of the first dielectric grains constituting the dielectric layer placed between the internal electrode layers along the laminating direction is Di, and an average grain size of the second dielectric grains in an exterior area placed outside of the laminating direction of an interior area in which the internal electrode layers are laminated interposing the dielectric layers along the laminating direction is Dg, Dg/Di≥1 is satisfied.

Namely, the second multilayer ceramic electronic device of the invention includes a ceramic element body, in which a plurality of dielectric layers and a plurality of internal electrode layers are alternately stacked, and at least a pair of external electrodes which are connected to the internal electrode layers on the surface of the ceramic element body, wherein the thickness of the dielectric layers is 0.5 μm or less; and in case that an average grain size of the first dielectric grains constituting the dielectric layer placed between the internal electrode layers along the laminating direction is Di, and an average grain size of the third dielectric grains constituting a lead-out area placed between the lead-out parts of the internal electrode layers connected to either one of the external electrodes is Dh, Dh/Di≥1 is satisfied.

Further, the multilayer ceramic electronic device of the invention has a structure in which 10% or more of a total number of the first dielectric grains contact both internal electrode layers, placed at the upper and the lower part of the dielectric layers.

In case that the average grain size "Di" of the first dielectric grain constituting "the capacitance region", the average grain size "Dg" of the second dielectric grain constituting "the exterior area", and the average grain size "Dh" of the thirst dielectric grain constituting "the lead-out areas" satisfy the above relations, the decrease of the specific permittivity is prevented even the dielectric layers are thinned. Further, with the structure in which 10% or more of the total number of the first dielectric grains constituting the capacitance region contact both internal electrode layers, placed at the upper and the lower part of the dielectric layers, the reliability of the obtained electronic device is improved.

DETAILED DESCRIPTION OF THE INVENTION

Hereinafter, the present invention will be described based on the embodiments shown by the figures.

Overall Structure of the Multilayer Ceramic Electronic Device

First, an overall structure of the multilayer ceramic electronic device according to the invention will be described, taking an example of the multilayer ceramic capacitor as a nonrestrictive example of the embodiments thereof.

Figure 1:
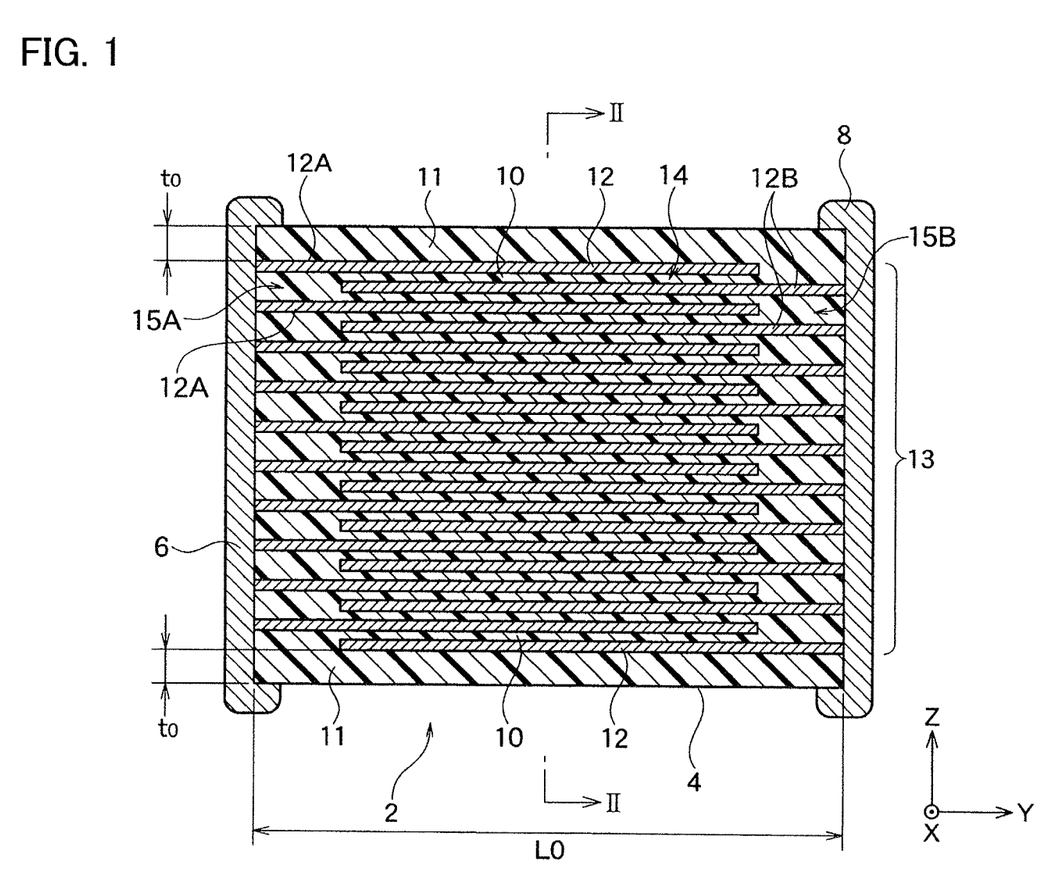
FIG. 1 is a schematic cross-sectional view of the multilayer ceramic capacitor according to an embodiment of the present invention.

As is shown in FIG. 1, multilayer ceramic capacitor 2 has a capacitor element body 4, the first terminal electrode 6 and the second terminal electrode 8. The capacitor element body 4 has an inside dielectric layers 10 and an internal electrode layers 12, in which the internal electrode layers 12 are alternately stacked between the inside dielectric layers 10. A part where the inside dielectric layers 10 and the internal electrode layers 12 are alternately stacked is an interior area 13.

The capacitor element body 4 has the exterior area 11 on both ends of the laminating direction Z (Z-axis) thereof. The exterior area 11 is formed by laminating a plurality of the dielectric layers, which are thicker than the inside dielectric layers 10 constituting the interior area 13.

One alternately stacked internal electrode layers 12 has a lead-out part 12A electrically connected to inside of the first terminal electrode 6, which is formed outside of the first end of the capacitor element body 4 in Y-axis direction. Further, the other alternately stacked internal electrode layers 12 has a lead-out part 12B electrically connected to inside of the second terminal electrode 8, which is formed outside of the second end of the capacitor element body 4 in Y-axis direction.

The interior area 13 has the capacitance region 14 and the lead-out areas 15A, 15B. The capacitance region 14 is a region where the internal electrode layers 12 are stacked sandwiching the inside dielectric layers 10 along the laminating direction. The lead-out area 15A is an area between the lead-out parts 12A of the internal electrode layers 12 connected to the external electrode 6. The lead-out area 15B is an area between the lead-out parts 12B of the internal electrode layers 12 connected to the external electrode 8.

Figure 2:
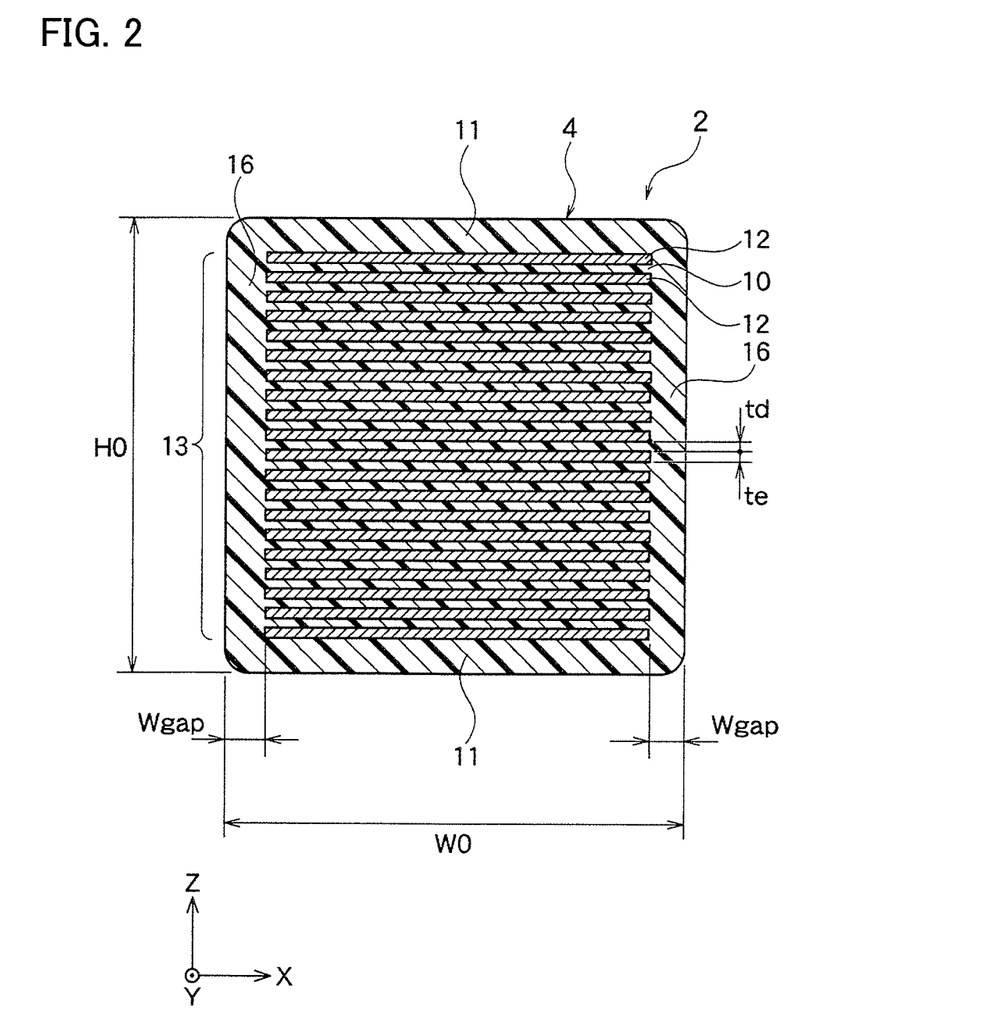
FIG. 2 is a cross-sectional view of FIG. 1 along line II-II.

FIG. 2 is a cross-sectional view of FIG. 1 along line II-II. As shown in FIG. 2, the side protection region 16 is formed on both ends of the capacitor element body 4 in X-axis direction. The side protection region 16 is configured by the same or the different dielectric material configuring the dielectric layers of inside dielectric layers 10 and/or the exterior area 11. Further, the dielectric materials configuring the lead-out areas 15A and 15B may be the same or different with the dielectric material configuring inside dielectric layers 10.

Materials of the dielectric layers configuring the inside dielectric layers 10 and the exterior area 11 may be the same or different; they are not particularly limited and may be the dielectric materials having the perovskite structure such as $ABO_3$. In said $ABO_3$, "A" is at least a kind of Ca, Ba, Sr and so on and "B" is at least a kind of Ti, Zr and so on. Mole ratio of A/B is not particularly limited and is 0.980 to 1.020.

Although materials of the internal electrode layers 12 are not particularly limited, metals of Ni, Cu, Ag, Pd, Al and so on, and their alloys can be used.

Although materials of terminal electrodes 6 and 8 are also not particularly limited, at least a kind of Ni, Pd, Ag, Au, Cu, Pt, Rh, Ru, Ir and so on, or their alloys may be used. Generally, Cu, Cu alloys, Ni, Ni alloys, Ag, Ag—Pd alloys, In—Ga alloys and so on may be used.

Size and formation of the multilayer ceramic capacitor 2 can be suitably determined according to the application or the purpose thereof. In case that the multilayer ceramic capacitor 2 has a rectangular parallelepiped shape, the lengthwise L0 (see FIG. 1) is generally 0.2 to 5.7 mm, however, it is preferably 0.2 to 2.0 mm, and more preferably 0.2 to 1.0 mm according to the present embodiment.

Note in FIG. 1, although a length of the capacitor element body 4 in Y-axis direction is drawn as the lengthwise L0 of the multilayer ceramic capacitor 2, it is almost the same with the length of the multilayer ceramic capacitor 2 in Y-axis direction including the terminal electrodes 6 and 8. Although the thickness of the terminal electrodes 6 and 8 is drawn thicker than the actual to easily show by the figures, it is 10 to 50 μm or so each in practice, and is extremely thin relative to the lengthwise L0. Further, in the figures, X-axis, Y-axis and Z-axis are mutually perpendicular, Z-axis corresponds to the lamination direction of the inside dielectric layers 10 and the internal electrode layers 12, and Y-axis corresponds to a direction in which the lead-out areas 15A and 15B (the lead-out parts 12A and 12B) are formed.

As shown in FIG. 2, a height H0 of the multilayer ceramic capacitor 2 varies according to laminating numbers of the inside dielectric layer 10 and the internal electrode layers 12. H0 is generally 0.1 to 5.0 mm, preferably 0.1 to 1.2 mm, and more preferably 0.1 to 0.5 mm in the present embodiment. Although the height H0 of the multilayer ceramic capacitor 2 is drawn as the thickness of the capacitor element body 4 in Z-axis direction in FIG. 2, H0 is almost the same with the thickness including the terminal electrodes 6 and 8 in FIG. 1, since thickness of the terminal electrodes 6 and 8 is sufficiently thin.

Although the width W0 of the multilayer ceramic capacitor 2 is generally 0.1 to 5.0 mm, it is preferably 0.10 to 1.20 mm, and more preferably 0.10 to 0.50 mm. In case that the thickness of the dielectric layers is 0.5 μm or less, cracks are easy to generate to the capacitor element body after manufacturing when the width W0 becomes excessively long.

Although the thickness td of each of the inside dielectric layers 10 (See FIG. 2) is generally several μm to several ten μm, it is 0.5 μm or less, preferably 0.5 to 0.1 μm, and more preferably 0.5 to 0.3 μm in the present embodiment. The thickness t0 of the internal electrode layers 12 (See FIG. 2) is preferably around the same with the thickness of the inside dielectric layers 10, it is preferably determined that to/td is 1.25 or less, and more preferably determined 0.95 to 1.05. The crack preventing effect is improved with such constitution.

Further, in the present embodiment, width Wgap of each side protection region 16 in X-axis direction shown in FIG. 2 matches with the gap from the outer surface (an end face in X-axial direction) of ceramic element body 4 to the end of internal electrode layers 12 along the width direction (X-axial direction) of the ceramic element body 4. This width Wgap is preferably 0.010 to 0.025 mm, and more preferably 0.015 to 0.025 mm. The cracks tend to occur when the width Wgap is excessively small, while decrease of the capacitance tends to be significant when the width Wgap is excessively large.

This width Wgap is determined considering the width W0 of capacitor 2, and in the present embodiment, the ratio Wgap/W0 is preferably 0.025 or more; the crack tends to generate in case said ratio is excessively small. Note each width Wgap of each side protection region 16 in X-axis direction formed on both sides of the capacitor element body 4 in X-axis direction may be mutually the same or different.

Although the thickness "t0" (see FIG. 1) of the exterior area 11 is not particularly limited, it is in a range of preferably 15 to 200 μm, and more preferably 15 to 80 μm. By setting the thickness t0 within such range, the cracks are suppressed, the internal electrode layers 12 and the inside dielectric layers 10 are protected, and it also contribute to the reduction in size. Each thickness t0 of the exterior area 11 formed on both ends of the capacitor element body 4 in Z-axis direction may be mutually the same or different.

Grain Size Constituting Each Dielectric Layer

In the first embodiment, in case that an average grain size of the first dielectric grains constituting the inside dielectric layer 10, placed between the internal electrode layers 12 (the capacitance region 14), is Di and an average grain size of the second dielectric grains placed in the exterior area 11 is Dg, Dg/Di≥1 is satisfied, Dg/Di≥1.05 is preferably satisfied, and Dg/Di≥1.15 is more preferably satisfied. With the constitution above, a capacitor device having a high capacitance in which a decrease of the specific permittivity is suppressed even when the dielectric layers are thinned can be obtained. It has been reported in general that the specific permittivity tends to decrease along with thinning of the dielectric layers. However, the present inventors have found that the decrease of the specific permittivity can be prevented even when the dielectric layers are thinned by controlling the grain size of the dielectric grains in the specific areas.

Although the upper limit of Dg/Di is not particularly limited, it is generally 2.0 or less, and preferably 1.7 or less, considering the restrictions such as the manufacturing condition.

Further, in the second embodiment, in case that an average grain size of the first dielectric grains constituting the capacitance region 14 is Di and an average grain size of the third dielectric grains constituting lead-out areas 15A and 15B is Dh, Dh/Di≥1 is satisfied, Dh/Di≥1.1 is preferably satisfied, and Dh/Di≥1.2 is the more preferably satisfied. With the constitution above, a capacitor device having a high capacitance in which a decrease of the specific permittivity is suppressed even when the dielectric layers are thinned can be obtained. It has been reported in general that the specific permittivity tends to decrease along with thinning of the dielectric layers. However, the present inventors have found that the decrease of the specific permittivity can be prevented even when the dielectric layers are thinned by controlling the grain size of the dielectric grains in the specific areas.

Although the upper limit of Dh/Di is not particularly limited, it is generally 2.0 or less, and preferably 1.9 or less, considering the restrictions such as the manufacturing condition.

Further, in the third embodiment, the average grain size of the first dielectric layers and the same of the second dielectric layers satisfy the above relations, and the average grain of the first dielectric layers and the same of the third dielectric layers also satisfy the above relations.

The reason to suppress decrease of the specific permittivity even when the dielectric layers are thinned can be considered as following, however, it is not theoretically tied to the reason. Namely, it is conceivable that compressive stress is provided to the dielectric of the capacitance region 14 by making the average grain of the dielectric grains in the capacitance region 14 the same or larger than the average grain of the dielectric grains constituting the exterior area 11 or the lead-out areas 15A and 15B. The multilayer ceramic capacitor generally shows higher capacitance when the capacity measurement is carried out when applying pressure, relative to the capacitance without applying pressure. This may be caused by the change of the surrounding condition of the dielectric layers, when the pressure is applied. It is conceivable that the pressure due to the particle growth in the surrounding area during the firing process effects as the compressive stress to the inner direction, by constituting the capacitance region with the dielectric grains having relatively small average grain size and constituting the surrounding area thereof with the dielectric grains having relatively large average grain size. Thus, it is conceivable that, with the constitution above, the compressive stress is regularly applied to the capacitance region and the specific permittivity improves.

In particular, it was confirmed that it was particularly effective when the thickness of the inside dielectric layers 10 is excessively thinned to 0.5 μm or less. In case that the dielectric layers are thicker than 0.5 μm, the specific permittivity is high without providing the compressive stress (without controlling the grain size ratio) to the dielectric of the capacitance region in the multilayer ceramic capacitor. While when the thickness of the dielectric layers is 0.5 μm or less, the decrease of the specific permittivity is prevented and the specific permittivity can be improved on the contrary, by controlling the grain size rate as mentioned above. Although the dielectric of the capacitance region 14 of the multilayer ceramic capacitor 2 has polycrystal body and that compression direction thereof is not limited, it is conceivable that making grain size of the dielectric of the exterior area 11 or the lead-out areas 15A and 15B large contributes to an improvement of the specific permittivity.

This can also be said to the dielectric grains in the side protection region 16, which can be constituted with the same dielectric grains in the lead-out areas 15A and 15B. Namely, according to the fourth embodiment, in case that the average grain size of the first dielectric grains constituting the capacitance region 14 is Di and the average grain size of the fourth dielectric grains constituting the side protection region 16 is Dh', Dh'/Di≥1 is preferably satisfied, Dh'/Di≥1.1 is more preferably satisfied, and Dh'/Di≥1.2 is the most preferably satisfied.

Although the upper limit of Dh'/Di is not particularly limited, it is generally 2.0 or less, and preferably 1.7 or less, considering the restrictions such as the manufacturing condition.

In addition, according to the fifth embodiment, the average grain size of the first dielectric grains and the same of the second, third and fourth dielectric grains satisfy the above relation.

The average grain size of the dielectric grains in each area constituting the multilayer ceramic electronic device of the present specification is obtained by the following. The internal electrode layers are exposed by grinding the side face of the capacitor sample, the dielectric grains in the capacitance region 14, the exterior area 11 and the lead-out areas 15A and 15B were observed by magnifying twenty thousand times using a scanning electron microscope. And using the image the analysis system, an equivalent circle size was calculated from the cross-section areas of 500 grains, Although the average grain size of the dielectric grains constituting each layer is not particularly limited when it satisfy the regulations mentioned above, the average grain size (Di) of the first dielectric grains constituting the capacitance region 14 is preferably 0.10 to 0.50 μm. The average grain size (Dg) of the second dielectric grains constituting the exterior area 11 is preferably 0.10 to 1.00 μm. The average grain size (Dh) of the third dielectric grains constituting the lead-outs 15A and 15B is preferably 0.10 to 1.00 μm. In addition, the average grain size (Dh') of the fourth dielectric grains constituting the side protection region 16 is preferably 0.10 to 1.00 μm.

The sixth embodiment is an aspect in which the total number of the first dielectric grains contacting both upper and lower dielectric layers is 10% or more, and preferably 10 to 80% in the first to fifth embodiments.

The first dielectric grains constitute the inside dielectric layers 10 interposed by the upper and lower internal electrode layers 12 in the capacitance region 14. In the present embodiment, the inside dielectric layers 10 is constituted by relatively large dielectric grains. In concrete, the grain size of a large number of the first dielectric grains constituting the inside dielectric layers 10 are preferably almost the same with the thickness of the inside dielectric layers 10. Each of the first dielectric grains having almost the same grain size with the thickness of the inside dielectric layer 10 contact the upper and the lower internal electrode layers 12. In the sixth embodiment, 10% or more and preferably 10 to 80% or more of a total number of the first dielectric grains placed in the capacitance region 14 contact the upper and the lower internal electrode layers 12. Note in case that 100% of the first dielectric grains contact the upper and lower part of the internal electrode layers 12, dielectric grains, having almost the same grain size with the thickness of the inside dielectric layer 10, are interposed between the internal electrode layers.

By making the grain size of the first dielectric grains constituting the capacitance region 14 relatively large as mentioned above, even when the thickness of the dielectric layers is made thin to 0.5 µm or less, decrease of the specific permittivity is suppressed, the capacitor with a high capacitance can be obtained, and the reliability also improves.

The ratio of the first dielectric grains contacting the upper and lower part of the internal electrode layers 12 is evaluated as following. The side face of the capacitor sample is grinded exposing the internal electrode layers, the line segment parallel to Z-axis and connecting the upper and the lower internal electrode layers is drawn, and the number of the grains (grains intersecting the line segment) contacting said line segment is counted. In case that only one grain exist in said line segment (in case that said line segment intersects with only one grain), it is determined that the grain is contacting the upper and the lower internal electrode layers. The above determination is carried out to the line segments of 100 or more, and the ratio of the first dielectric grains contacting the upper and the lower internal electrode layers is calculated.

Method for Manufacturing the Multilayer Ceramic Capacitor

Next, a method for manufacturing the multilayer ceramic capacitor 2 as an embodiment of the invention will be described. First, a method for manufacturing a typical multilayer ceramic capacitor will be described. First, a paste for an inside green sheet and a paste for an outside green sheet are prepared in order to manufacture an inside green sheet 10a constituting the inside dielectric layer 10 and an outside green sheet 11a constituting an outside dielectric layer of an exterior area 11, after firing shown in FIG. 1.

The paste for the inside green sheet and the paste for the outside green sheet are generally composed of an organic solvent based paste, obtained by kneading ceramic powdery material having a main component composed of a compound having a perovskite crystalline structure and a subcomponent of oxides such as Mg, Ca, Ba, Si, a rear earth and so on, with an organic vehicle dispersant, or a water based paste.

The compound having the perovskite crystalline structure as a main component is shown by a general equation $ABO_3$. In the equation, "A site" is an element of one or more kinds selected from Ba, Ca, Sr and Mg, "B site" is an element of one or more kinds selected from Ti, Zr, and Hf. In the present embodiment, as the main component of the dielectric oxides, $BaTiO_3$ constituted by Ba as "A site" and Ti as "B site", (Ba, Ca)(Ti, Zr)$O_3$ constituted by Ba and Ca as "A site" and Ti and Zr as "B site" are particularly preferable.

The ratio [A]/[B] of a mole number [A] of the element constituting "A site" and a mole number [B] of the element constituting "B site" satisfy $0.980 \leq [A]/[B] \leq 1.020$, more preferably satisfy $0.990 \leq [A]/[B] \leq 1.010$, and the most preferably satisfy $0.995 \leq [A]/[B] \leq 1.010$.

Sintering property decreases and densifying becomes difficult in case that [A]/[B] is extremely small or extremely large. The measurement of [A]/[B] can be carried out by a fluorescent X ray analysis, ICP analysis and so on. As ICP (inductive coupling plasma) analysis, ICP emission spectrometry using ICP emission spectral analyzer or ICP mass spectrometry using ICP mass spectrometer may be mentioned.

The subcomponent is suitably selected from carbonates, nitrates, hydro oxides, the organic metal compounds and so on; and used by mixing thereof.

The materials of the ceramic powdery material are used as the powder having the average particle size of 0.20 µm or less in the present embodiment. The followings can be carried out, in order to achieve the desired Dg/Di ratio, Dh/Di ratio and Dh′/Di ratio. The ceramic powdery material forming the capacitance region and the ceramic powdery material forming the other regions (the exterior area, the lead-out area, the side protection region) may be selected to have different average particle size; the ceramic powdery material or composition of the subcomponent may be selected to obtain different particle growth speed. These will be described as following.

The organic vehicle is obtained by dissolving a binder in the organic solvent. The binder used for the organic vehicle is not particularly limited, and may be suitably selected from various kinds of general binders such as ethyl cellulose, polyvinyl butyral, and etc.

The organic solvent is also not particularly limited and may be suitably selected from various kinds of the organic solvents, such as terpineol, butyl carbitol, acetone, toluene, and etc., according to a process, such as a printing process or a sheet process.

The paste for the green sheet may include additives selected from a variety of dispersants, plasticizers, dielectrics, subcomponent compounds, glass frits, insulators and so on, according to needs.

As the plasticizers, phthalic esters such as dioctyl phthalate or benzylbutyl phthalate and so on, adipic acids, phosphoric esters, glycols and so on can be exemplified.

Next, a paste for internal electrode pattern layer forming the internal electrode layers 12 shown in FIG. 1 is prepared. The paste for internal electrode pattern layers is prepared by kneading the conductive materials constituted by the above-mentioned various conductive metals and alloys thereof, or various oxides, organic metal compounds, etc., which become the above-mentioned conductive materials after firing, and the abovementioned organic vehicle. The paste for internal electrode pattern layers may include ceramic powder as an inhibitor, when required. Note said inhibitor works to prevent sintering of the conductive powders during the firing process.

Figure 3:
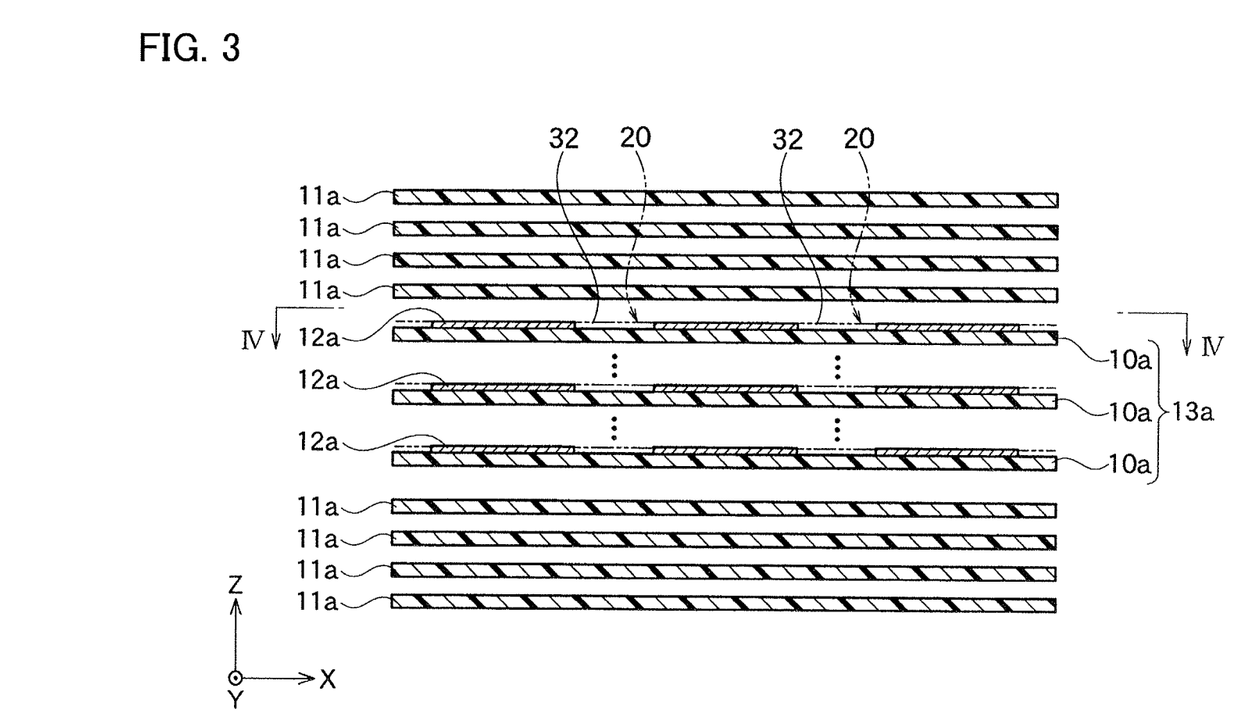
FIG. 3 is a schematic cross-sectional view showing the laminating process of the green sheets in manufacturing process of the multilayer ceramic capacitor as shown in FIG. 1.

By using the paste for the inside green sheet and the paste for internal electrode pattern layer prepared above, the internal laminated body 13a, which becomes the interior area 13 after firing, is manufactured by alternately laminating the inside green sheet 10a, which becomes the inside dielectric layer 10 after firing, and the internal electrode pattern layer 12a, which becomes the internal electrode layers 12 after firing, as shown in FIG. 3. Further, after or before manufacturing the internal laminated body 13a, the outside green sheet 11a, which becomes an outside dielectric layer of the exterior area 11 after firing is formed by using the paste for the outside green sheet.

In concrete, the inside green sheet 10a is formed on the carrier sheet (e.g. PET film) as support such as by doctor blade method, at first. The inside green sheet 10a is dried after formed on the carrier sheet.

Next, the inside green sheet 10a having the internal electrode pattern layer 12a is obtained by forming the internal electrode pattern layer 12a on the inside green sheet 10a formed as described above by using the paste for internal electrode pattern layer. Then, said inside green sheets 10a having the internal electrode pattern layers 12a are alternately laminated and the internal laminated body 13a is obtained. Although formation method of the internal electrode pattern layer 12a is not particularly limited, printing process, transfer process, or so may be mentioned. Note the inside green sheets 10a having the internal electrode pattern layers 12a can be laminated via the adhesive layers.

Similar to the inside green sheet 10a, the outside green sheet 11a is formed on the carrier sheet as the support. The outside green sheet 11a is dried after forming on the carrier sheet. Note the thickness of the outside green sheet 11a is sufficiently thicker than the inside green sheet 10a.

Figure 4:
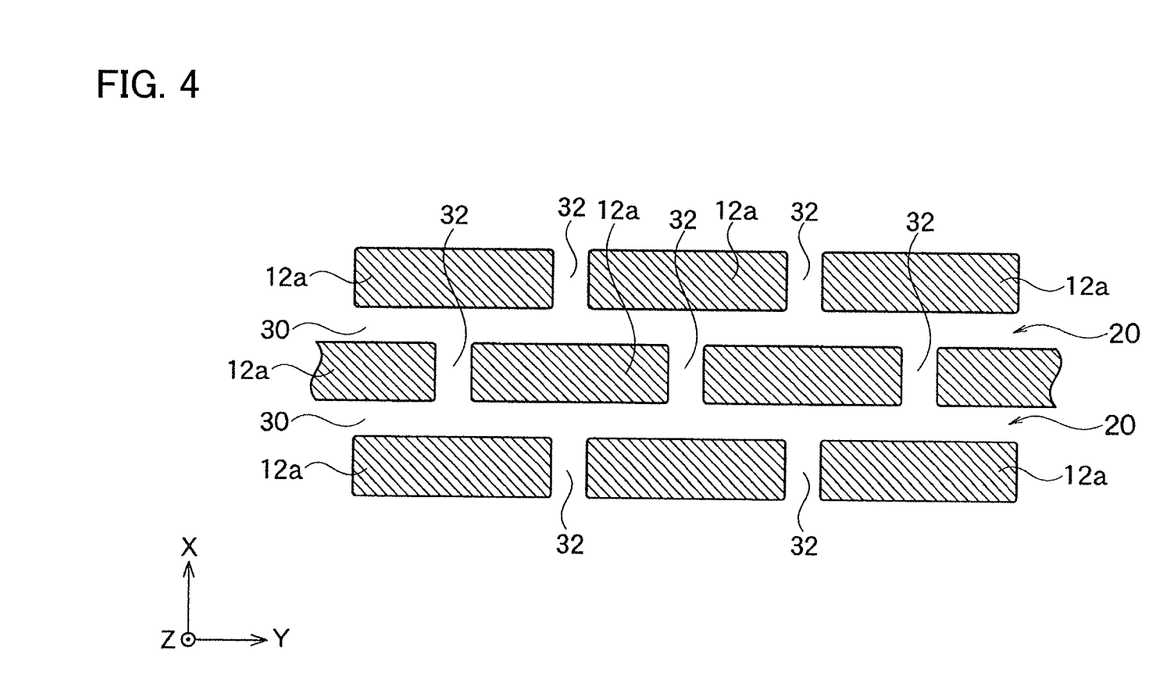
FIG. 4 is a plane view showing a part of a pattern of the internal electrode layer of FIG. 3 along line IV-IV.

FIG. 4 is a plane view showing a part of a pattern of the internal electrode layer of FIG. 3 along line IV-IV. As shown in FIG. 4, the internal electrode pattern layers 12a are formed on surfaces of the inside green sheets 10a; and therebetween, a gap 30 along a longitudinal direction Y of the internal electrode pattern layer 12a and a gap 32 along a short-length direction X of the internal electrode pattern layer 12a are formed, which show the lattice pattern in the plan views. Within the gaps 30 and 32 of the lattice pattern, step absorbing layers 20 shown in FIG. 3 can be formed. Note FIG. 3 only shows the gap 32.

Forming the step absorbing layers 20 in these gaps 30 and 32 will eliminate difference in level on the green sheet 10a due to the internal electrode pattern layer 12a; and this will also contributes to deformation prevention of the finally obtained the capacitor element body 4. The step absorbing layers 20 formed at the gaps 30 form the side protection regions during the subsequent firing; and the step absorbing layers 20 formed at the gaps 32 form the lead-out areas during the subsequent firing. The step absorbing layers 20 is formed by such as printing process, similar with e.g. the internal electrode pattern layer 12a. The step absorbing layers 20 include the ceramic powders and the organic vehicle, similar with the green sheet 10a. The step absorbing layers 20, however, unlike the green sheet 11a, is formed by printing; and that it is adjusted easy to print. Although the printing process is not particularly limited, screen printing, gravure printing and so on is mentioned, and the screen printing is preferable.

The various additives and an organic binder component (polymer resin+plasticizer) of the printing pate for forming the step absorbing layers 20 are similar to the ones used for the slurry of the green sheet. Except, they are not necessary the same with the ones used for the slurry of the green sheet, and can be different. Although the thickness of the step absorbing layers 20 is not particularly limited, it is preferably 50 to 100% with respect to the thickness of the internal electrode pattern layer 12a.

Note a prescribed number of the inside green sheets 10a and the internal electrode pattern layers 12a may be alternately laminated directly on the outside green sheet 11a, instead of laminating the internal laminated body 13a on the outside green sheet 11a. In addition, a laminated body unit, in which a plurality of the inside green sheets 10a and a plurality of the internal electrode pattern layers 12a are alternately laminated, may be preliminary manufactured; and a predetermined number of said laminated body units may be laminated on the outside green sheet 11a.

Figure 5A:
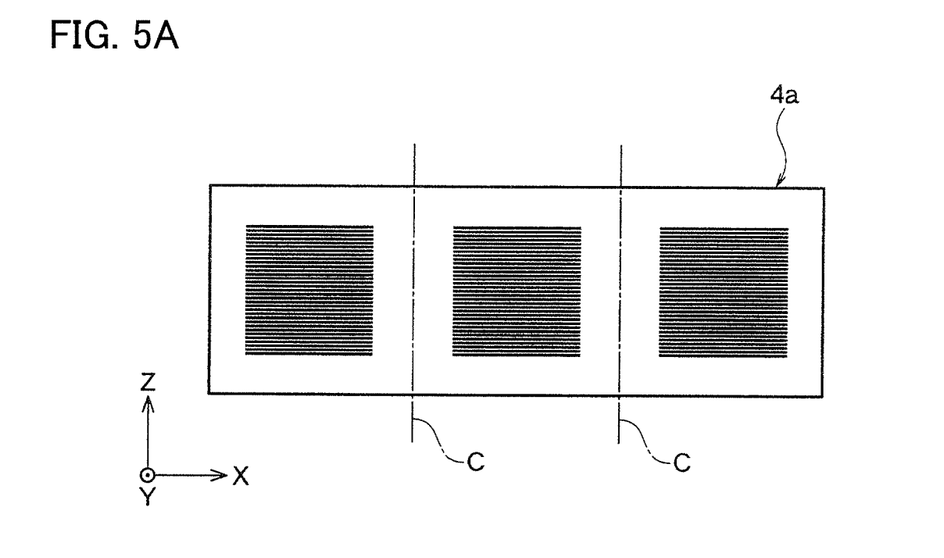
FIG. 5A is a schematic cross-sectional view parallel to X-Z axis plane of a laminated body after laminating the green sheets shown in FIG. 3.
Figure 5B:
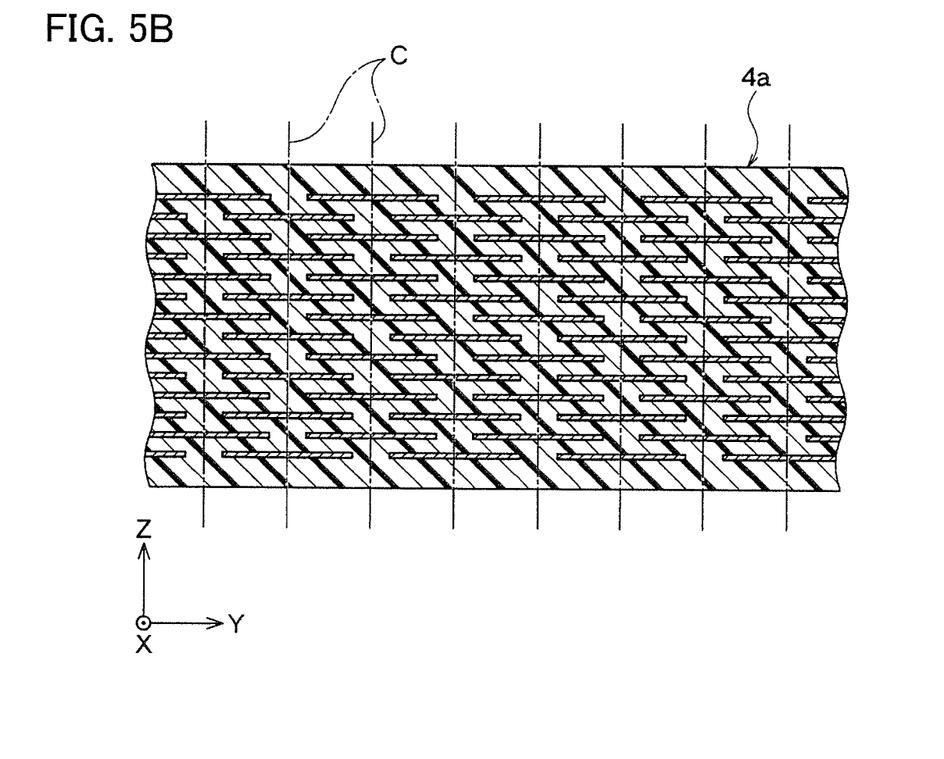
FIG. 5B is an enlarged schematic cross-sectional view parallel to Y-Z axis plane of a laminated body after laminating the green sheets shown in FIG. 3.

As shown in FIGS. 5A and 5B, the obtained green laminated body 4a is cut to a predetermined size along, e.g. the cut line C, making the green chips. The plasticizer is removed and the green chips are solidified by drying and solidification of the green chips. The green chips after drying and solidification are put in a barrel container with a media and a polishing solution, and barrel polished by such as a horizontal centrifugal barrel machine. The green chips after the barrel polish are washed with water and dried. The capacitor element body 4 shown in FIG. 1 can be obtained by carrying out a de-binder process, a firing process and an anneal process when required to the green chips after drying. Note FIGS. 5A and 5B are only the schematic cross-sectional views, and laminating numbers or the dimensional relations differ from the actual.

An end polishing by such barrel polish is carried out to the thus obtained sintered body (element body 4), the paste for the terminal electrode is fired on the sintered body, and the terminal electrodes 6 and 8 are obtained. Then, such as plating is carried out on the terminal electrodes 6 and 8 when required, forming the pad layer. Note the paste for the terminal electrode can be prepared similar to the paste for internal electrode pattern layer mentioned above.

Thus manufactured multilayer ceramic capacitor 2 is implemented on such as a printing substrate by such as soldering, and is used for various electronic equipment and so on.

According to a non-limited example of the multilayer ceramic capacitor 2, the thickness of the dielectric layer 10 is preferably 0.5 µm or less, the width W0 is preferably 0.59 mm or less, the gap Wgap is preferably 0.010 to 0.025 mm, and a ratio of the gap with respect to the width: Wgap/W0 is preferably 0.025 or more. Thus, even when the thickness of the dielectric layer is made thin, generation of the cracks can be prevented and the decrease of the capacitance is less.

According to the general method for manufacturing the multilayer ceramic capacitor, the particle size of the dielectric particles included in the dielectric paste as materials forming each dielectric grains constituting the inside dielectric layer 10, the exterior area 11, the lead-out areas 15A and 15B, and the side protection region 16 shown in FIGS. 1 and 2 are approximately the same. Therefore, in the multilayer ceramic capacitor 2 obtained as a result, in case that the thickness of the dielectric layer 10 sandwiched between the internal electrode layers 12 is made 0.5 µm or less, the average grain size of the dielectric grains in the dielectric layer 10 sandwiched between the internal electrode layers 12 tends to be larger than the same of the dielectric grains in the exterior areas 11, the lead-out areas 15A and 15B, which are not sandwiched between the internal electrode layers 12.

The cause may be considered as following, however, it is not theoretically tied to. The metal particles, such as Ni or Cu used for the internal electrode layers 12, contract and densify faster than the dielectric particles during the firing process. Thus, stress due to compression of the electrode layer is applied to the dielectric layer 10 interposed between the internal electrode layers 12 during the firing process. As a result, densifying is promoted in the dielectric layers around the electrode layers relative to the other areas, and thus, it is considered that the particle growth is easily generated. This tendency is further progressed by thinning the dielectric layers 10 and the distance between the dielectric material particles and the upper and the lower electrode layer decreases. Therefore, with the thinning of the dielectric layers, the particle growth of the dielectric particles in the dielectric layers 10 interposed between the internal electrode layers 12 tends to be progressed.

Namely, with the general method for manufacturing of the multilayer ceramic capacitor, Dg/Di, Dh/Di, Dh'/Di are all tends to be less than 1, when the dielectric layers are thinned.

Considering all above, according to the preferable method for manufacturing of the multilayer ceramic electronic device of the invention, the average particle size (di) of the dielectric particles as the dielectric paste material constituting the inside dielectric layer 10 is made relatively larger than the average particle sizes (dg, dh, dh') of the dielectric particles included in the dielectric paste material forming each dielectric particles constituting the exterior area 11 and/or the lead-out areas 15A, 15B or the side protection region 16. In other words, the average particle size (dg, dh, dh') of the dielectric particles included in the dielectric paste material forming each dielectric particles constituting the outer area (the exterior area 11 and/or the lead-out areas 15A, 15B and the side protection region 16) is made smaller than the average particle size (di) of the dielectric particles as the dielectric material paste constituting the capacitance region (the inside dielectric layers 10). The smaller the particle size of the material particle is, it is activated to heat during sintering and tends to generate particle growth. On the other, the particle growth during sintering process is suppressed in case that the material particle is larger. Thus, after the firing process, the size relation of the grain size of the dielectric grains in the capacitance region and the same of the dielectric grains in the outer area is reversed after the firing process; and the grain size of the dielectric grains in the outer area becomes large. Dg, Dh and Dh' become Di or more.

Further, although the particle size of MgO, CaO, BaO, $SiO_2$ and the rare earth oxide and so on used also as the subcomponent is not particularly limited, the particle size of the subcomponents used in each area are preferably determined in accordance with the method similar to the particle size of the dielectric particle materials mentioned above.

The average particle sizes of the dielectric particles used as the raw material of the invention and the subcomponents thereof are calculated as an equivalent circle size with the method similar to the grain size after firing.

The capacitor element body 4 after firing satisfy the relations of either Dg/Di≥1, Dh/Di≥1 or Dh'/Di≥1, combinations thereof, or all of said relations can be satisfied by controlling the particle size of the dielectric particles used as the raw material as mentioned above.

It has been reported that the specific permittivity generally decreases as the inside dielectric layer 10 becomes thin. The present inventors, however, have found that the decrease of the specific permittivity can be suppressed even when the inside dielectric layer 10 is thinned by controlling the grain size of the dielectric grains in the specific areas as described above.

In addition, the above relations may be satisfied in the capacitor element 4 after firing by the method other than changing the average particle size of the dielectric particles in the dielectric paste material. For instance, the composition of the dielectric particles included in the dielectric paste material forming each dielectric grain constituting the exterior area 11 and/or the lead-out areas 15A and 15B and the composition of the dielectric particles as the dielectric paste material constituting the inside dielectric layers 10 may be made different. For instance, the composition of the dielectric particles included in the dielectric paste material forming each dielectric grain constituting the exterior area 11 and/or the lead-out areas 15A, 15B may be made to a composition which easily generate the particle growth.

The grain size of the dielectric grains after firing can be also controlled by interposing a dummy electrode, not connected to the terminal electrodes 6 and 8, between outside dielectric green sheets 11a at the exterior area 11. Particle growth of the dielectric grains is progressed near the electrode layers as mentioned above. Thus, said particle growth of the dielectric grains in the exterior area is progressed when said dummy electrode is used in the exterior area 11, and Dg value tends to increase.

In addition, in preferable embodiment of the invention, among a total number of the first dielectric grains existing in the capacitance region 14, 10% or more of said grains contact the upper and the lower internal electrode layers 12. Namely, in the invention, the capacitance region 14 is formed with relatively large dielectric grains. The ratio of such dielectric grains contacting the upper and the lower electrode layers is possible to increase by promoting the particle growth with the temperature increase during firing and making the grain size of the dielectric large. In addition, the same effect can be obtained by making the particle size of the dielectric particles of an inhibitor included in the paste for internal electrode pattern layers small.

Note the invention is not limited to the embodiments mentioned above, and can be varied within the range of the invention.

For instance, the multilayer ceramic electronic device of the invention can be applied not only to the multilayer ceramic capacitor, but to the other multilayer type ceramic electronic device. As the other multilayer type ceramic electronic device, all the electronic devices, in which the dielectric layers are laminated via internal electrode can be mentioned; and for instance, band-pass filter, inductor, multilayer three-terminal filter, piezoelectric element, PTC thermistor, NTC thermistor, varistor and so on can be mentioned.

EXAMPLES

Hereinafter, the present invention will be described based on the further details of the examples; however, the invention is not limited to the examples.

Example 1

Firstly, $\{(Ba_{1-x-y} Ca_x Sr_y)O\}_u(Ti_{1-z}Zr_z)_vO_3$ powder (x=0.05, y=0, z=0.05 and u/v=1.004) having the average particle size of 100 nm as a powdery material of the main material was prepared. Next, $MgCO_3$, $MnCO_3$, $Y_2O_3$, $SiO_2$ were respectively prepared as subcomponents. Note the subcomponents were preliminary broken down in advance and processed to around 40 nm.

Next, each powdery material prepared above was weighed by the followings. 0.5 moles of $MgCO_3$ powder, 0.3 moles of $MnCO_3$ powder, 0.2 moles of $Y_2O_3$ powder, and 2 moles of $SiO_2$ powder, with respect to 100 moles of the main material were weighed. Said each powdery material was wet mixed for 20 hours with ball mill, and dried thereof to obtain a dielectric raw material forming the capacitance part. The added MgCO$_3$ and MnCO$_3$ were included in the dielectric ceramic composition after firing as MgO and MnO, respectively.

Next, 100 parts by weight of the obtained dielectric raw material, 10 parts by weight of polyvinyl butyral resin, 5 parts by weight of dioctyl phthalate (DOP) as the plasticizer, and 100 parts by weight of an alcohol as the solvent were mixed by a ball-mill and were pasted to obtain the dielectric layer paste of the capacitance region 14.

Further, in addition to above, 44.6 parts by weight of Ni particles, 52 parts by weight of terpineol, 3 parts by weight of ethyl cellulose and 0.4 parts by weight of benzotriazole were kneaded by a triple-roll, pasted thereof to manufacture an internal electrode layer paste.

In addition, as the dielectric material of the exterior area 11, a powdery main material having 100 nm average particle size, which is the same with the dielectric particles of the capacitance region 14, and a powdery main material having 60 nm average particle size, which is smaller than the dielectric particles of the capacitance region 14, were prepared. By the same method with the dielectric material of the capacitance region 14, the powdery main material and the subcomponents were wet-mixed by ball-mill for 20 to 60 hours, pasted, and the dielectric layer paste in the exterior area was obtained.

Note when manufacturing the dielectric layer paste in the capacitance region 14 and the exterior area 11, wet-mix by ball-mill was carried out for 20 to 60 hours and pasted thereof. The degree of the particle growth during subsequent firing step can be adjusted by the wet-pulverizing time with the ball-mill. In concrete, the paste easy to generate the particle growth can be obtained by lengthening the pulverizing time.

The dielectric layer paste manufactured above was used to form the green sheet on a PET film. The thickness of the green sheet forming the capacitance region was adjusted to obtain the thickness of the dielectric layers after firing as described in Table 1. Next, an electrode layer was printed thereon in a predetermined pattern by using the internal electrode layer paste. The thickness of the electrode layer in the predetermined pattern was adjusted to obtain 0.45 μm thick internal electrode layers after firing.

Further, in order to absorb steps, where the electrodes are not printed, the step absorbing layer 20 was formed by carrying out the pattern printing using the same as the dielectric paste in the capacitance region 14, and the green sheet 10a having the internal electrode pattern layers 12a and the step absorbing layers 20 was manufactured.

Next, the dielectric paste for forming the exterior area 11 was used to form the green sheet on a PET film. The thickness of the green sheet for forming the exterior area 11 was made 10 μm. At the time, the green sheet for forming the exterior area 11 was formed by the green sheet using the dielectric raw material of 100 nm in samples 1 to 5, and by the green sheet using the dielectric raw material of 60 nm in samples 6 to 15. Note considering samples 7 to 11, the wet-pulverizing time was different and the pulverizing time increased as the number of the sample increased. The same manner was applied to samples 12 and 13.

Plurality of the green sheets for the interior area 13 having the internal electrode layers and plurality of the green sheets for the exterior area 11 were laminated, and adhered thereof by pressure to obtain a green laminated body. The green laminated body was then cut to a predetermined size to obtain the green chips.

Next, the binder removal process, the firing and the annealing were carried out to the obtained green chip under the following conditions, and obtained a multilayer ceramic fired body.

The binder removal process was performed under a rate of temperature increase of 25° C./hour, a holding temperature of 235° C., a holding time of 8 hours, and an atmosphere of air.

Firing conditions were the rate of temperature increases of 600 to 1,000° C./hour, the holding temperature of 1,100 to 1150° C., the holding time of 1 hour, and the rate of temperature decrease of 200° C./hour, and the atmospheric gas was a humidified N$_2$+H$_2$ mixed gas and an oxygen partial pressure of $10^{-12}$ MPa.

Annealing conditions were the rate of temperature increase of 200° C./hour, the holding temperature of 1,050° C., the holding time of 3 hours, the rate of temperature decreases of 200° C./hour, and the atmospheric gas of a humidified N$_2$ gas (an oxygen partial pressure: $10^{-7}$ MPa).

Note a wetter was used to humidify the atmospheric gas when firing and annealing.

Next, after polishing end faces of the obtained multilayer ceramic fired body, Cu paste as the external electrode was coated thereon, and then firing processing was performed in a reduced atmosphere to obtain sample numbers 1 to 15 of the multilayer ceramic capacitor samples (hereinafter, sometimes merely referred to as "capacitor sample") as shown in Table 1.

The size of the obtained capacitor sample was 1.0 mm×0.5 mm×1.0 mm, and the thicknesses of the dielectric layers of the capacitance region were as shown in Table 1. Further, the thickness of the internal electrode layers was 0.45 μm, and the number of the dielectric layers was 300 layers.

The specific permittivity and the average grain size of the dielectric in each region of the obtained capacitor samples were respectively confirmed by the following methods.

(The Specific Permittivity)

The specific permittivity of the capacitor samples were measured at a reference temperature of 25° C. by digital LCR meter under the conditions of frequency at 1.0 kHz and input signal level (measured voltage) at 1.0 Vrms. 1 hour heat treatment at 150° C. was carried out to the capacitor sample, and the specific permittivity (no unit) was calculated from the capacitance value, the thickness of the dielectric, and an overlapped area of the internal electrodes after 24 hours. The higher specific permittivity is preferable. In the present example, ones having 10% higher specific permittivity than the comparative example, in which the thickness of the dielectric layers are the same, were determined good (Decision B), and ones having 20% or more higher specific permittivity than the same were determined excellent (Decision A). Further, ones showing rate improvement of the specific permittivity less than 10% were determined Decision C.

(The Average Grain Size of the Dielectric)

Sample numbers 1 to 15 of the multilayer ceramic capacitor samples were made to stand vertically making the lamination direction upside, and periphery of the samples were embedded with a curable resin by using a Tefron (a registered trademark) made vessel of 25 mm size and 20 mm long. Then, samples were grinded to show the cross-section along the longitudinal direction using the sandpaper and a fine processing grinder; and milling using argon ion was carried out to remove the damage of the surface. The dielectric grains in each region were observed by magnifying the grinded surface of the processed samples twenty thousand times using a scanning electron microscope. And using the image analysis system, an equivalent circle size was calculated from the cross-section areas of 500 grains.

TABLE 1

| Sample No. | Dielectric particle materials | | Thickness of dielectric layers (μm) | Capacitor dielectric grain | | | | Evaluation |
|---|---|---|---|---|---|---|---|---|
| | Capacitance Region di (nm) | Exterior area dg (nm) | | Capacitance region Di (μm) | Exterior area Dg (μm) | Grain size ratio Dg/Di | Specific permittivity | |
| 1 | 100 | 100 | 0.45 | 0.33 | 0.26 | 0.79 | 3400 | — |
| 2 | 100 | 100 | 0.5 | 0.34 | 0.27 | 0.79 | 3600 | — |
| 3 | 100 | 100 | 0.35 | 0.32 | 0.27 | 0.84 | 3350 | — |
| 4 | 100 | 100 | 0.3 | 0.27 | 0.23 | 0.85 | 2900 | — |
| 5 | 100 | 100 | 0.65 | 0.34 | 0.29 | 0.85 | 4000 | — |
| 6 | 100 | 60 | 0.65 | 0.34 | 0.36 | 1.06 | 4050 | C |
| 7 | 100 | 60 | 0.45 | 0.33 | 0.33 | 1.00 | 3800 | B |
| 8 | 100 | 60 | 0.45 | 0.33 | 0.35 | 1.06 | 3900 | B |
| 9 | 100 | 60 | 0.45 | 0.33 | 0.38 | 1.15 | 4150 | A |
| 10 | 100 | 60 | 0.45 | 0.33 | 0.46 | 1.39 | 4080 | A |
| 11 | 100 | 60 | 0.45 | 0.33 | 0.52 | 1.58 | 4100 | A |
| 12 | 100 | 60 | 0.5 | 0.34 | 0.34 | 1.00 | 4010 | B |
| 13 | 100 | 60 | 0.5 | 0.34 | 0.41 | 1.21 | 4350 | A |
| 14 | 100 | 60 | 0.35 | 0.32 | 0.34 | 1.06 | 3750 | B |
| 15 | 100 | 60 | 0.3 | 0.27 | 0.29 | 1.07 | 3350 | B |

Note in sample numbers 1 to 15, dielectric particles having 100 nm average particle size were used for the step absorbing paste forming the lead-out areas and the side protection region. Thus, Dh/Di and Dh'/Di in sample numbers 1 to 15 were less than 1.

Dh/Di in sample numbers 1 to 5 was less than 1.0, and the thickness of the dielectric layers in sample numbers 5 and 6 was 0.65 μm; and all the samples do not satisfy the requirements of the first embodiment. In view of the comparison between sample number 1 and the sample numbers 7 to 11, the comparison between sample number 2 and the sample numbers 12 and 13, the comparison between sample number 3 and the sample number 14, and the comparison between sample number 4 and the sample number 15, it was confirmed that the specific permittivity improves 10% or more by making Dh/Di 1.0 or more, even when the thicknesses of the dielectric layers are the same. On the other hand, in view of the comparison between the sample number 5 and the sample number 6, it was confirmed that an improvement effect of the specific permittivity is low even by making Dh/Di 1.0 or more, in case that the thicknesses of the dielectric layers was 0.65 μm.

Example 2

Capacitor samples of sample numbers 16 to 25 were manufactured similarly with sample number 1, except dielectric particles having the average particle size shown in Table 2 were used for the step absorbing paste forming the lead-out areas, and the thickness of the green sheet forming the capacitance region was adjusted to obtain the thickness of the dielectric layers after firing as shown in Table 2. Note the wet-pulverizing time of sample numbers 17 to 20 were different; the pulverizing time was made longer as the sample number increased.

TABLE 2

| Sample No. | Dielectric particle materials | | Thickness of dielectric layers (μm) | Capacitor dielectric grain | | | | Evaluation |
|---|---|---|---|---|---|---|---|---|
| | Capacitance Region di (nm) | Lead-out area dh (nm) | | Capacitance region Di (μm) | Lead-out area Dh (μm) | Grain size ratio Dh/Di | Specific permittivity | |
| 16 | 100 | | 0.45 | 0.33 | 0.29 | 0.88 | 3600 | — |
| 17 | 100 | 60 | 0.45 | 0.33 | 0.33 | 1.00 | 4100 | A |
| 18 | 100 | 60 | 0.45 | 0.33 | 0.45 | 1.36 | 4200 | A |
| 19 | 100 | 60 | 0.45 | 0.33 | 0.53 | 1.61 | 4100 | A |
| 20 | 100 | 60 | 0.45 | 0.33 | 0.62 | 1.88 | 4150 | A |
| 21 | 100 | 100 | 0.5 | 0.34 | 0.31 | 0.91 | 3800 | — |
| 22 | 100 | 60 | 0.5 | 0.34 | 0.55 | 1.62 | 4350 | A |
| 23 | 100 | 100 | 0.35 | 0.32 | 0.28 | 0.88 | 3550 | — |
| 24 | 100 | 60 | 0.35 | 0.32 | 0.39 | 1.22 | 4050 | A |
| 25 | 100 | 100 | 0.65 | 0.34 | 0.39 | 1.15 | 4050 | C |

Note in sample numbers 16 to 25, the lead-out areas and the side protection region were formed using the same step absorbing paste; and thus, the values of Dh'/Di and Dh/Di were almost the same. In addition, the dielectric paste forming the exterior area 11 was the same with that of sample 1; and thus, Dh/Di became less than 1 in the capacitor sample of the sample numbers 16 to 25.

Dh/Di in sample numbers 16, 21 and 23 were less than 1.0, and the thickness of the dielectric layers in sample number 25 was 0.65 μm; and all the samples do not satisfy the requirements of the second embodiment. In view of the comparison between sample number 16 and the sample numbers 17 to 20, the comparison between sample number 21 and the sample number 22, and the comparison between sample number 23 and the sample number 24, it was confirmed that the specific permittivity improves 10% or more by making Dh/Di 1.0 or more, even when the thicknesses of the dielectric layers are the same. On the other hand, in view of the comparison between the sample number 25 and the sample number 5, it was confirmed that an improvement effect of the specific permittivity is low even by making Dh/Di 1.0 or more, in case that the thicknesses of the dielectric layers is 0.65 μm.

Example 3

${(Ba_{1-x-y} Ca_x Sr_y)O}_u (Ti_{1-z} Zr_z)_v O_3$ powder (x=y=z=0 and u/v=1.004) having the average particle size of 100 nm as a powdery material of the main material was prepared. Next, $MgCO_3$, $MnCO_3$, $Y_2O_3$, $SiO_2$ were respectively prepared as subcomponents. Note the subcomponents were preliminary broken down in advance and processed to around 40 nm.

Next, each powdery material prepared above was weighed by the followings. 0.3 moles of $MgCO_3$ powder, 0.2 moles of $MnCO_3$ powder, 0.6 moles of $Y_2O_3$ powder, and 2 moles of $SiO_2$ powder, with respect to 100 moles of the main material were weighed. Said each powdery material was wet mixed for 20 hours with ball mill, and dried thereof to obtain the dielectric raw material for forming the capacitance region.

Further, similar to Example 1, a powdery main material having the average particle size of 100 nm and a powdery main material having the average particle size of 60 nm were prepared as the dielectric raw material for forming the exterior area 11, the lead-out areas and the side protection region. Similar to the method of the dielectric raw material of the interior region 13, said each powdery main material was wet-mixed and pasted with the subcomponents, and obtained the dielectric paste for the exterior area, the lead-out areas and the side protection region.

In sample number 26, the powdery main material having the average particle size of 100 nm was used for both the dielectric paste for forming the exterior area and the dielectric paste for the lead-out areas and the side protection region.

In sample numbers 27 and 28, the powdery main material having the average particle size of 60 nm was used for the dielectric paste forming the exterior area, and the powdery main material having the average particle size of 100 nm was used for the dielectric paste forming the lead-out areas and the side protection region. Note in sample numbers 27 and 28, the wet-pulverizing time for preparing the dielectric paste for forming the exterior area was different; the pulverizing time was made longer as the sample number increased.

In sample numbers 29 and 30, the powdery main material having the average particle size of 100 nm was used for the dielectric paste forming the exterior area, and the powdery main material having the average particle size of 60 nm was used for the dielectric paste forming the lead-out areas and the side protection region. Note in sample numbers 29 and 30, the wet-pulverizing time for preparing the dielectric paste for forming the lead-out areas and the side protection region was different; the pulverizing time was made longer as the sample number increased.

Example 4

${(Ba_{1-x-y} Ca_x Sr_y)O}_u (Ti_{1-z} Zr_z)_v O_3$ powder (x=y=z=0 and u/v=1.004) having the average particle size of 100 nm as a powdery material of the main material was prepared. Next, $MgCO_3$, $MnCO_3$, $Y_2O_3$, $SiO_2$ were respectively prepared as subcomponents. Note the subcomponents were preliminary broken down in advance and processed to around 40 nm.

Next, each powdery material prepared above was weighed by the followings. 1.5 moles of $MgCO_3$ powder, 0.2 moles of $MnCO_3$ powder, 0.8 moles of $Y_2O_3$ powder, and 2 moles of $SiO_2$ powder, with respect to 100 moles of the main material were weighed. Said each powdery material was wet mixed for 20 hours with ball mill, and dried thereof to obtain a dielectric raw material for forming the capacitance region.

Further, similar to Example 1, a powdery main material having the average particle size of 100 nm and a powdery main material having the average particle size of 60 nm were prepared as the dielectric raw material for forming the exterior area 11, the lead-out areas and the side protection region. Similar to the method of the dielectric raw material of the interior region 13, said each powdery main material was wet-mixed and pasted with the subcomponents, and obtained a dielectric paste for the exterior area, the lead-out areas and the side protection region.

In sample number 31, the powdery main material having the average particle size of 100 nm was used for both dielectric paste for forming the exterior area and the dielectric paste for the lead-out areas and the side protection region.

In sample numbers 32 and 33, the powdery main material having the average particle size of 60 nm was used for the dielectric paste forming the exterior area, and the powdery main material having the average particle size of 100 nm was used for the dielectric paste forming the lead-out areas and the side protection region. Note in sample numbers 32 and 33, the wet-pulverizing time for preparing the dielectric paste for forming the exterior area was different; the pulverizing time was made longer as the sample number increased.

In sample numbers 34 and 35, the powdery main material having the average particle size of 100 nm was used for the dielectric paste forming the exterior area, and the powdery main material having the average particle size of 60 nm was used for the dielectric paste forming the lead-out areas and the side protection region. Note in sample numbers 34 and 35, the wet-pulverizing time for preparing the dielectric paste for forming the lead-out areas and the side protection region was different; the pulverizing time was made longer as the sample number increased.

TABLE 3

| | Dielectric particle materials | | | Thickness | Capacitor dielectric grain | | | | | | |
|---|---|---|---|---|---|---|---|---|---|---|---|
| Sample No. | Capacitance Region di (nm) | Exterior area dg (nm) | Lead-out area dh (nm) | of dielectric layers (μm) | Capacitance region Di (μm) | Exterior area Dg (μm) | Lead-out area Dh (μm) | Grain size ratio Dg/Di | Grain size ratio Dh/Di | Specific permittivity | Evaluation |
| 26 | 100 | 100 | 100 | 0.45 | 0.30 | 0.24 | 0.26 | 0.80 | 0.87 | 3700 | — |
| 27 | 100 | 60 | 100 | 0.45 | 0.30 | 0.32 | 0.27 | 1.07 | 0.90 | 4250 | B |
| 28 | 100 | 60 | 100 | 0.45 | 0.30 | 0.38 | 0.26 | 1.27 | 0.87 | 4550 | A |
| 29 | 100 | 100 | 60 | 0.45 | 0.30 | 0.27 | 0.31 | 0.90 | 1.03 | 4100 | B |
| 30 | 100 | 100 | 60 | 0.45 | 0.30 | 0.28 | 0.38 | 0.93 | 1.27 | 4500 | A |
| 31 | 100 | 100 | 100 | 0.45 | 0.13 | 0.12 | 0.12 | 0.92 | 0.92 | 2200 | — |

TABLE 3-continued

| | Dielectric particle materials | | | Thickness | Capacitor dielectric grain | | | | | | |
|---|---|---|---|---|---|---|---|---|---|---|---|
| Sample No. | Capacitance Region di (nm) | Exterior area dg (nm) | Lead-out area dh (nm) | of dielectric layers (μm) | Capacitance region Di (μm) | Exterior area Dg (μm) | Lead-out area Dh (μm) | Grain size ratio Dg/Di | Grain size ratio Dh/Di | Specific permittivity | Evaluation |
| 32 | 100 | 60 | 100 | 0.45 | 0.13 | 0.15 | 0.12 | 1.15 | 0.92 | 2500 | B |
| 33 | 100 | 60 | 100 | 0.45 | 0.13 | 0.18 | 0.11 | 1.38 | 0.85 | 2950 | A |
| 34 | 100 | 100 | 60 | 0.45 | 0.13 | 0.12 | 0.16 | 0.92 | 1.23 | 2450 | B |
| 35 | 100 | 100 | 60 | 0.45 | 0.13 | 0.12 | 0.19 | 0.92 | 1.46 | 3000 | A |

Note in sample numbers 26 to 35, the lead-out areas and the side protection region were formed using the same step absorbing paste; and thus, Dh'/Di were almost the same with Dh/Di of each sample.

Dg/Di and Dh/Di in sample numbers 26 and 31 were less than 1.0, which do not satisfy the requirements of the first and the second embodiments. Dg/Di in sample numbers 27, 28, 32 and 33 was 1.0 or more, which satisfy the first embodiment, and Dh/Di in sample numbers 29, 30, 34 and 35 was 1.0 or more, which satisfy requirements of the second embodiment. In view of the comparison between sample number 26 and the sample numbers 27 and 28, and the comparison between sample number 31 and the sample numbers 32 and 33, it was confirmed that the specific permittivity improves 10% or more by making Dg/Di 1.0 or more, even when the thicknesses of the dielectric layers are the same. In view of the comparison between the sample number 26 and the sample numbers 29 and 30, and the comparison between the sample number 31 and the sample numbers 34 and 35, it was confirmed that the specific permittivity improves 10% or more by making Dh/Di 1.0 or more, even when the thicknesses of the dielectric layers are the same.

Example 5

Capacitor samples of sample numbers 36 to 38 were manufactured similarly with the same of sample number 9, except firing conditions were the rate of temperature increase of 600° C./hour, the holding temperature of 1,080° C. (sample number 36), 1,115° C. (sample number 37), and 1,135° C. (sample number 38), and the holding time of 1 hour.

In the obtained capacitor sample, the ratio of the first dielectric grains, contacting the upper and the lower internal electrode layers, among the total number of said dielectric grains existing in the capacitance region was calculated by the method below. The reliability of the obtained capacitor samples were evaluated by the following method.

(Calculating the Ratio of the Dielectric Particles Contacting the Upper and the Lower Internal Electrode Layers)

The surface vertical to the internal electrodes of the obtained capacitor sample was exposed using the sandpaper and the grinder; and milling using argon ion was carried out. 3 minutes heat treatment at 1,000° C. was carried out, in order to easily observe grain boundary. Next, an electron image of the cut-surface by scanning electron microscope (FE-SEM) was photographed. The number of the photograph of the electron image, the observed area, and the magnification are not particularly limited; it is preferable for the photograph (may be taken multiple times) to include about 500 or more dielectric grains in total. In addition, the magnification is preferably around 20,000. Considering the obtained electron image, the line segment parallel to the laminated direction (Z-axis) and connecting the upper and the lower internal electrode layers was drawn, and the number of the grains (grains intersecting the line segment) contacting said line segment was counted. In case that only one grain exist in said line segment (in case that said line segment intersects with only one grain), it was determined that the grain is contacting the upper and the lower internal electrode layers. The above determination was carried out to the line segments of 100 or more, and the ratio of the first dielectric grains contacting the upper and the lower internal electrode layers was calculated.

(High-Temperature Load Lifetime: Reliability of the Capacitor)

High-temperature load lifetime was evaluated by measuring the insulation deterioration time of the capacitor sample, while holding DC voltage applied state in an electric field of 6V at 170° C. to said capacitor samples. In the present embodiment, the time between starting of the voltage apply to reduction of the insulation resistance to one tenth was determined the lifetime. In addition, the above evaluation was carried out to 20 capacitor samples and Mean Time To Failure (MTTF) calculated from Weibull analysis thereof was determined an average lifetime of the samples. An hour or more was determined "Good". Note in Table 4, an hour or more of MTTF was determined "A", and less than an hour was determined "B".

TABLE 4

| | Dielectric particle materials | | | | Capacitor dielectric grain | | | | | | Ratio of the grains | |
|---|---|---|---|---|---|---|---|---|---|---|---|---|
| Sample No. | Capacitance Region di (nm) | Exterior area dg (nm) | Lead-out area dh (nm) | Firing temperature (° C.) | Capacitance region Di (μm) | Exterior area Dg (μm) | Lead-out area Dh (μm) | Grain size ratio Dg/Di | Grain size ratio Dh/Di | Specific permittivity | contacting the upper and the lower electrodes (%) | Reliability evaluation |
| 36 | 100 | 60 | 100 | 1080 | 0.25 | 0.27 | 0.26 | 1.08 | 1.04 | 3700 | 2% | B |
| 9 | 100 | 60 | 100 | 1100 | 0.33 | 0.38 | 0.27 | 1.15 | 0.82 | 4150 | 10% | A |

TABLE 4-continued

| | Dielectric particle materials | | | | Capacitor dielectric grain | | | | | Ratio of the grains | |
|---|---|---|---|---|---|---|---|---|---|---|---|
| Sample No. | Capacitance Region di (nm) | Exterior area dg (nm) | Lead-out area dh (nm) | Firing temperature (° C.) | Capacitance region Di (μm) | Exterior area Dg (μm) | Lead-out area Dh (μm) | Grain size ratio Dg/Di | Grain size ratio Dh/Di | Specific permittivity | contacting the upper and the lower electrodes (%) | Reliability evaluation |
| 37 | 100 | 60 | 100 | 1115 | 0.38 | 0.4 | 0.35 | 1.05 | 0.92 | 4650 | 35% | A |
| 38 | 100 | 60 | 100 | 1135 | 0.40 | 0.43 | 0.38 | 1.08 | 0.95 | 5050 | 80% | A |

In sample number 36, Dg/Di and Dh/Di satisfied the requirements of the first and the second embodiments. The specific permittivity slightly improved relative to sample number 1, in which Dg/Di and Dh/Di do not satisfy the same. However, due to the low firing temperature, the first dielectric grain of the capacitance region was small, and the ratio of the dielectric grain contacting the upper and the lower electrode was small. Thus, the reliability evaluation was not sufficient. It was confirmed from the sample numbers 9, 37, 38 that the specific permittivity improved as the firing temperature improved and the particle growth of the first dielectric grains in the capacitance region progressed. It was further confirmed that as the particle growth of the first dielectric grain in the capacitance region progressed, the ratio of the dielectric grains contacting the upper and the lower electrodes increased and the reliability improved.

DESCRIPTIONS OF THE NUMERALS

2: Multilayer ceramic capacitor
4: Capacitor element body
6: The first terminal electrode
8: The second terminal electrode
10: Inside dielectric layers
   10a: Inside green sheet
11: Exterior area
   11a: Outside green sheet
12: Internal electrode layers
   12A, 12B: Lead-out part
   12a: Internal electrode pattern layer
13: Interior area
   13a: Internal laminated body
14: Capacitance region
15A, 15B: Lead-out areas
16: Side protection region
20: Step absorbing layers

What is claimed is:

1. A multilayer ceramic electronic device comprising:
a ceramic element body, in which a plurality of dielectric layers and a plurality of internal electrode layers are alternately stacked, and
at least a pair of external electrodes which are connected to the internal electrode layers on surfaces of the ceramic element body, wherein
a thickness of the dielectric layers is 0.5 μm or less, and Dg/Di>1 is satisfied, in case that an average grain size of first dielectric grains constituting the dielectric layer placed between the internal electrode layers along the laminating direction is Di and
an average grain size of second dielectric grains in an exterior area placed outside of the laminating direction of an interior area, in which the internal electrode layers are laminated interposing the dielectric layers along the laminating direction, is Dg.

2. The multilayer ceramic electronic device as set forth in claim 1, wherein 10% or more of a total number of the first dielectric grains contact the internal electrode layers, placed at the upper and the lower part of the dielectric layers.

3. The multilayer ceramic electronic device as set forth in claim 1, wherein Dg/Di≤2.0 is satisfied.

4. The multilayer ceramic electronic device as set forth in claim 1, wherein a thickness of the dielectric layers is 0.4 μm or less.

5. A multilayer ceramic electronic device comprising:
a ceramic element body, in which a plurality of dielectric layers and a plurality of internal electrode layers are alternately stacked, and
at least a pair of external electrodes which are connected to the internal electrode layers on surfaces of the ceramic element body, wherein
Dh/Di>1 is satisfied, in case that
an average grain size of first dielectric grains constituting the dielectric layer placed between the internal electrode layers along the laminating direction is Di and
an average grain size of third dielectric grains constituting a lead-out area placed between lead-out parts of the internal electrode layers connected to either one of the external electrodes is Dh.

6. The multilayer ceramic electronic device as set forth in claim 5, wherein 10% or more of a total number of the first dielectric grains contact the internal electrode layers, placed at the upper and the lower part of the dielectric layers.

7. The multilayer ceramic electronic device as set forth in claim 5, wherein Dh/Di≤2.0 is satisfied.

8. The multilayer ceramic electronic device as set forth in claim 5, wherein a thickness of the dielectric layers is 0.5 μm or less.

9. The multilayer ceramic electronic device as set forth in claim 5, wherein a thickness of the dielectric layers is 0.4 μm or less.

10. A multilayer ceramic electronic device comprising:
a ceramic element body, in which a plurality of dielectric layers and a plurality of internal electrode layers are alternately stacked, and
at least a pair of external electrodes which are connected to the internal electrode layers on surfaces of the ceramic element body, wherein
Dh'/Di>1 is satisfied, in case that
an average grain size of first dielectric grains constituting the dielectric layer placed between the internal electrode layers along the laminating direction is Di and
an average grain size of fourth dielectric grains in a side protection region placed outside of a width direction of an interior area, in which the internal electrode layers are laminated interposing the dielectric layers along the laminating direction, is Dh'.

11. The multilayer ceramic electronic device as set forth in claim 10, wherein Dh'/Di≤2.0 is satisfied.

12. The multilayer ceramic electronic device as set forth in claim 10, wherein 10% or more of a total number of the first dielectric grains contact the internal electrode layers, placed at the upper and the lower part of the dielectric layers.

13. The multilayer ceramic electronic device as set forth in claim 10, wherein a thickness of the dielectric layers is 0.5 μm or less.

14. The multilayer ceramic electronic device as set forth in claim 10, wherein a thickness of the dielectric layers is 0.4 μm or less.

* * * * *